United States Patent Office 3,817,856
Patented June 18, 1974

3,817,856
METHOD FOR CONTACTING LIQUID AND SOLID PARTICLES
Stuart W. Aaron and Johannes W. F. M. Lemmers, Amsterdam, Netherlands, assignors to Shell Oil Company, New York, N.Y.
Original application Nov. 16, 1970, Ser. No. 89,967, now Patent No. 3,759,669. Divided and this application Oct. 12, 1972, Ser. No. 297,099
Claims priority, application Netherlands, Nov. 24, 1969, 6917651
Int. Cl. C10g 23/10
U.S. Cl. 208—213                              9 Claims

ABSTRACT OF THE DISCLOSURE

An apparatus and a process wherein a solid-liquid slurry is circulated in a vertical reactor by means of gas lift action in a centrally located tube inside the reactor. One or more hydrocyclones are used to clarify liquid product leaving the reactor and to return slurry solids to the reactor. The process is particularly desirable for catalytically desulfurizing residual oils in the presence of hydrogen.

CROSS-REFERENCES TO RELATED APPLICATIONS

This application is a division of application Ser. No. 89,967 filed Nov. 16, 1970, now U.S. Patent No. 3,759,669.

BACKGROUND OF THE INVENTION

Field.—The invention relates to a method of and an apparatus for contacting a liquid with solid particles, particularly catalytically active particles which, suspended in the liquid, are present in a vertical reactor.

The invention is particularly advantageous for processes using residual oils or oil fractions, where the desired reaction occurs in the liquid phase, generally under conditions of a high pressure and high temperature. The invention is also of importance in chemical processes where the solid binds a component of the liquid.

Prior art.—A solid-liquid suspension must be kept in motion to prevent settling of the solid particles and to promote a good contact with the liquid. In many catalytic processes recycle of the liquid is desirable, recycle being easily accomplished by means of a circulating-pump system. This frequently results in poor heat economy. By keeping the suspension within the reactor heat economy can be improved. In many exothermal processes the temperature must be kept in a narrow range, which is often difficult. In addition, the reaction product must be freed from solid particles, the solid particles being returned to the reactor.

SUMMARY OF THE INVENTION

The invention includes an apparatus for contacting liquid with solid particles suspended therein, particularly catalytically active particles which are present in a reactor mounted to have its long axis vertical. The suspension in the reactor is recycled by a gas lift action in the reactor which is operated by gas supplied to the lower part of the gas lift installation. Means are also provided for separately removing both a liquid stream and a gas stream from the upper end of the reactor, and means are provided for separating solid particles from the liquid removed from the reactor with hydrocyclones, and for liquid product to be passed outside the reactor and returning the solids to the reactor.

In the method of the invention the energy required for circulation of the solid-liquid suspension is supplied by the gas without any action of a mechanical device having moving parts in the suspension. Consequently, the reliability is very much increased. Owing to the erosive action of the suspension the life of a mechanical pump used for circulating the suspension would be short.

The liquid inlet to the reactor is preferably near the inlet of the gas lift installation. This results in the fresh liquid becoming immediately involved in the circulation.

Above the gas lift installation any gas that is present in the form of bubbles is separated from the liquid. This can be done in a simple way by maintaining an interface between liquid and gas above the gas lift installation, so that a gas cap is present in the reactor near the place where gas is removed from the reactor. The gas leaving the reactor may—after purification if necessary—be recycled. Purification may be necessary when, for instance in a catalytic process, one or more gaseous by-products are formed.

In a process in which one of the reactants is a gas, the gas providing the gas lift action may, at least partly, consist of that reactant. The quantity of gaseous reactant consumed during the process may be made up by addition of a corresponding quantity of that gas to the recycle gas.

Here the thorough contact between gas and liquid in the gas lift installation plays an important part. A large number of gas bubbles are present in the gas lift installation so that it is easy for gas to dissolve in the liquid under the prevailing conditions. This dissolved gas can take part in the reaction both in the gas lift and in the space outside it. Preferably, the conditions of flow and the ratio in which liquid and gas are mixed in the gas lift installation are chosen so that at the end of the gas lift installation the liquid is saturated with gas to the extent of at least 50% under the prevailing conditions of pressure and temperature. Among the factors that are promotive to a high degree of saturation are small gas bubbles, a large gas supply and a long residence time in the gas lift installation. It is also preferred that the size of the gas bubbles in the gas lift installation be between 0.5–5 mm., and that the ratio of gas to liquid in the gas lift installation, expressed in volume units, be from 0.2:1 to 2:1.

The method of the invention is very suitable for the conversion, particularly for the desulfurization, of residual oils or oil fractions, because the method is carried out in the liquid phase, so that the residue-containing oil need not be vaporized. The gas to be used in the gas lift installation then consists mainly of hydrogen and the ratio of the recycle liquid to liquid supplied is from 4:1 to 20:1, preference being given to a recycle ratio of from 5:1 to 10:1. It is preferred that the particle size of the catalyst should be 100–500 microns.

For this process many catalysts are known that are resistant to sulfur. Mention is made particularly of cobalt-molybdenum on alumina as carrier material and of nickel-molybdenum-phosphorus on alumina.

The reaction conditions may be varied over a wide range, depending on the composition of the feed. Temperature generally varies between 350–475° C., preference being given to a temperature of 385–445° C. Hydrogen partial pressure generally varies btween 50–225 kg./cm.$^2$, preference being given to a pressure of 100–175 kg./cm.$^2$. Space velocity generally varies between 0.1–10 parts by weight of feed per part by volume of catalyst per hour, preference being given to a space velocity of 0.5–3. Preferably, the process conditions are chosen so that at least 40% desulfurization is accomplished, preference being given to 50–85° desulfurization. It is also preferred that the ratio of the stream of gas to the stream of liquid in the gas lift installation be from 0.5–1 to 1.0:1.

An apparatus suitable for carrying out a solid-liquid contacting process comprises:

(a) a reactor mounted to have its long axis vertical;
(b) a tube, preferably open at both ends, centrally located inside the reactor;
(c) a gas inlet to the reactor which opens into the lower end of the centrally located tube;
(d) a gas outlet from the reactor near the upper end of the tube;
(e) at least one liquid inlet to said reactor;
(f) at least one liquid outlet from said reactor; and
(g) at least one hydrocyclone attached to said liquid outlet, provided with a standpipe for discharging liquid product.

The hydrocyclone inlet for the suspension is located at a distance no greater than one reactor diameter from the upper end of the tube. The hydrocyclone standpipe ends inside the reactor near the lower end of the tube and the hydrocyclone outlet for liquid product ends outside the reactor.

This reactor forms a compact assembly without any moving part. Means may be present for recycling gas that leaves the reactor. These means are mounted outside the reactor and comprise a compressor and a pipeline system and may also comprise an installation for gas purification.

In the hydrocyclone two streams will form. Through the upper outlet will flow liquid product that is entirely free from solid particles or that contains those particles in a lower concentration than the suspension in the reactor. Through a standpipe will flow a suspension in which the concentration of solid particles is higher than in the suspension in the reactor. It is desirable that provision be made for the ratio between the rate of flow of liquid from the lower outlet and the rate of flow of liquid from the upper outlet of each hydrocyclone to be at least 1.0, a value of 2 being preferred for this ratio. The viscosity of the suspension in the standpipe will then remain sufficiently low. The suspension in the standpipe will be able to flow back into the reactor through the connection between the end of that standpipe and the reactor if the pressure is slightly above atmospheric pressure. This condition is met because, owing to the high concentration of solid particles in the suspension in the standpipe, the density of that suspension is higher than the density of the suspension in the reactor. In this way it is ensured that no pump is required for the suspension flowing back to the reactor.

It is preferred that the hydrocyclone(s) be located inside the reactor in the annular space between the tube and the reactor (a). If at least two hydrocyclones are present, then these hydrocyclones may be so arranged as to be distributed evenly over a cross section through the reactor. The hydrocyclone inlet for suspension and the standpipe outlet are located in the annular space, the upper outlet for liquid product passes through the wall of the reactor and extends outside the reactor. Mounting the hydrocyclone(s) inside the reactor has the great advantage that both recycling and the separation of solid particles take place inside the reactor. This enables heat economy to be carefully controlled, which in many processes is essential. Also, the risk of leakage is reduced.

Each hydrocyclone can be mounted outside the reactor. This will be done, for instance, if frequent cleaning is required to prevent clogging. Then the process may continue while the hydrocyclone in question is temporarily cut off.

There is a possibility that the product from the upper outlet of each hydrocyclone will contain too many solid particles. Then each hydrocyclone may be paired with a second hydrocyclone located outside the reactor. As a rule sufficient pressure will be present in the reactor for the flow through the hydrocyclones to be maintained.

The suspension from the lower outlet of a second hydrocyclone may be returned to the reactor if the lower outlet of the second hydrocyclone is connected to the low-pressure inlet of a suction apparatus based on the liquid jet principle whose outlet opens into the reactor and whose high-pressure inlet is connected to a liquid supply inlet to the reactor. The energy required to return the suspension from the second hydrocyclone to the reactor is then supplied by the feed stream.

Generally, a baffle will be provided inside the reactor below the gas outlet to keep liquid from being entrained with gas leaving the reactor.

The ratio between the diameter of the centrally located tube and the diameter of the reactor generally ranges from about 0.25:1 to 0.7:1.

DESCRIPTION OF DRAWING

The invention will now be further elucidated with reference to the accompanying drawing which illustrates a cross sectional and elevation views of an apparatus embodying the invention.

Figure 1:
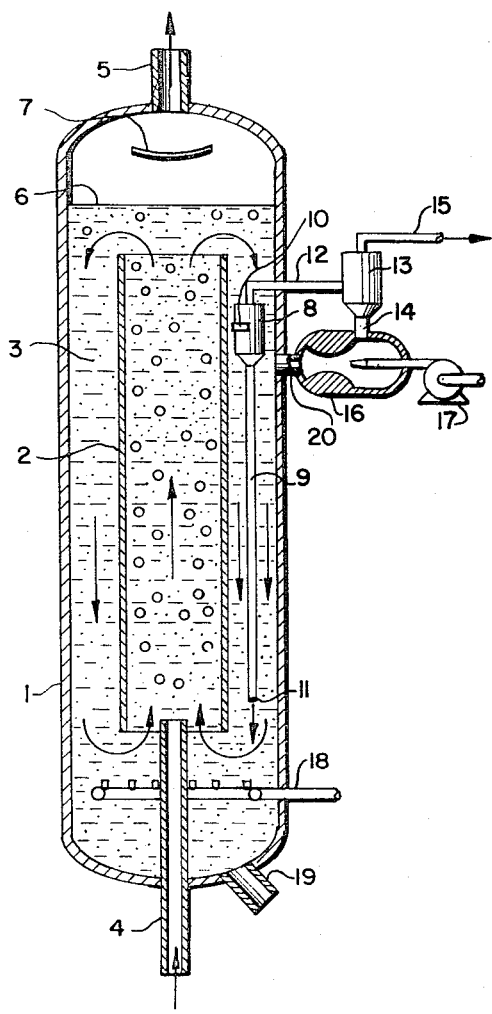
In FIG. 1, item 1 is the reactor. In it there is present a centrally located tube 2, open at both ends. Between the tube and the reactor is an annular space 3. Tube 2 can extend as far as the lower end of the reactor and openings can be present in the lower section of the tube. Tube 2 can also extend upwardly near the top of the reactor and can have openings in the upper section of the tube. In the latter instance, it is preferred that the tube be closed at the upper end above the openings. Gas is supplied to the reactor via inlet 4 and discharged via outlet 5. In the reactor is a suspension of solid particles in liquid. By the gas lift action the suspension in the tube 2 is moved in an upward direction. Circulation then occurs through the annular space via the gas lift installation. The arrows indicate the direction of the flow. On leaving tube 2 free gas in the suspension is released in the upper part of the reactor, owing to the low velocity of flow in that part. A liquid level 6 is maintained in the reactor during operation. A baffle 7 can prevent entrained suspension from entering the gas outlet 5. Other means for catching droplets of liquid, such as woven mats, curved inertia separators, etc., can also be used.

In the annular space 3 is a hydrocyclone 8 provided with a standpipe 9. This hydrocyclone permits the discharge of liquid product freed from solid particles, which solid particles are reintroduced into the reactor. To this end provision has been made for the inlet 10 of the hydrocyclone to be present in the upper part of the annular space, for the outlet 11 to be present in the lower part of that space and for the upper outlet 12 to open outside the reactor. The standpipe 9 should be long enough that the hydrostatic pressure of the concentrated suspension contained in it is sufficient to cause that suspension to flow through the outlet 11 to the reactor.

An inlet for fresh liquid 19 may be located at any place in the reactor. A suitable location is, for instance, near the inlet 4 for gas. If, however, the product passed outside the reactor via outlet 12 is not sufficiently free from solid particles, then the stream of fresh liquid to the reactor may be used in the further purification of the product. To accomplish this a second hydrocyclone 13 can be connected, outside the reactor, to the upper outlet 12 of the hydrocyclone 8. In this installation a suspension flows from outlet 14 to a liquid jet suction apparatus 16 through which fresh liquid is introduced into the reactor under pressure through line 20, e.g., by means of a pump 17, the low-pressure side of the suction apparatus being connected to the outlet 14. Consequently, the suspension flowing from outlet 14 is carried along with the liquid and returned to the reactor. Through the upper outlet 15 a pure liquid product is discharged.

Solid particles may be added to the reactor as a slurry with the liquid feed or by other suitable means, e.g., by pressuring dry solid particles directly into the reactor.

Solid particles may be withdrawn, if required, by suitable valve and piping arrangements so that the process may be operated continuously without shutting down for a catalyst change.

The reactor may further be provided with a manifold 18 by which solid particles that have settled in the absence of circulation may be redispersed by means of a stream of liquid or of gas.

Figure 2:
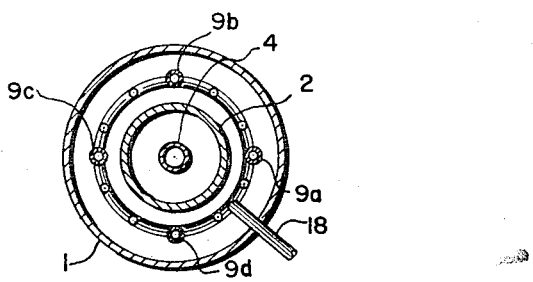

The cross section (FIG. 2) through an apparatus according to the invention shows the reactor 1, the tube 2, and an embodiment which contains four hydrocyclones present in the reactor, represented by the cross sections 9a, 9b, 9c and 9d of the standpipes.

Figure 3:
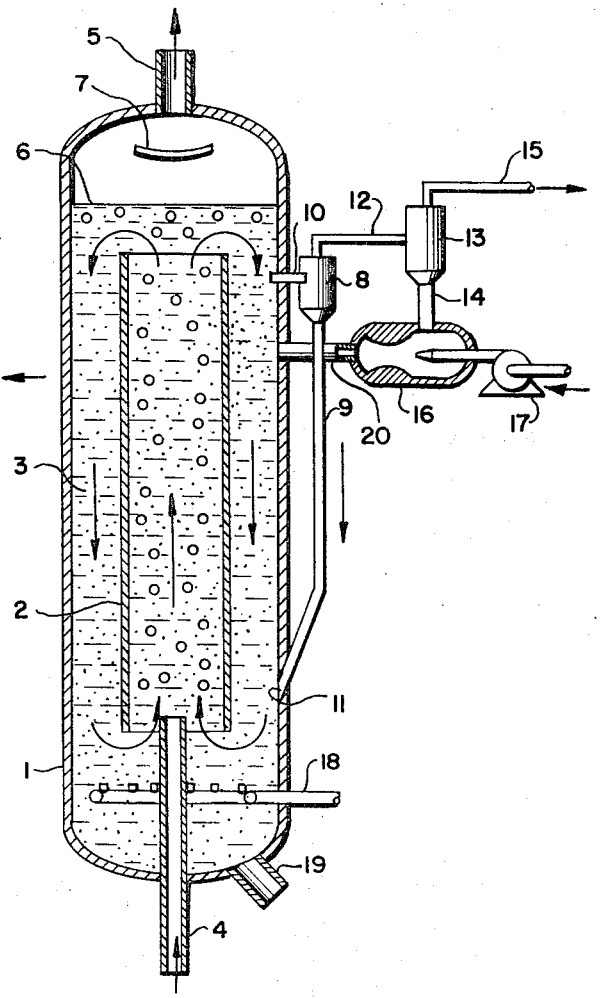

In FIG. 3 the same numerals represent the components indicated earlier. Here the hydrocyclone 8 is located outside the reactor, but both the inlet 10 and the outlet 11 of the standpipe 9 are connected to the reatcor 1, so that it is possible for the suspension in standpipe 9 to flow back under the influence of liquid pressure.

If more than one hydrocyclones 8 are present, either within or outside the reactor 1, then the inlets 10 may be connected to a common pipeline, which pipeline opens into the reactor. Also, the lower outlets of the hydrocyclones 8 may be connected to one common standpipe 9. The same construction may be used for the inlets of hydrocyclones 13. The outlets 14 of hydrocyclones 13 can also be connected to a common pipeline, which pipeline is connected to the low-pressure side of the suction apparatus 16. In that case there is only one suction apparatus 16 and one pump 17. Each common pipeline as mentioned hereinbefore may also be a common space. These possibilities, which are within the state of the art, are not further indicated here.

We claim as our invention:

1. A method for hydrodesulfurizing a liquid residual oil by contacting said liquid with solid catalyst particles suspended therein which comprises:
    (a) introducing said liquid and solid catalyst particles into a vertically elongated reactor having therein a centrally located axial tube extending over a major portion of said reactor and having openings at both ends and a diameter sized to pass the solid-liquid suspension upwardly in said tube;
    (b) introducing hydrogen gas into the bottom of said tube whereby said solid catalyst particles are suspended in said liquid and the suspension is circulated inside said reactor;
    (c) withdrawing gas from the upper part of said reactor;
    (d) separating a reduced sulfur content liquid from the suspended solids by passing said suspension through at least one hydrocyclone having an inlet for withdrawing the solid-liquid suspension from a point not greater than one reactor diameter below the upper opening of said centrally located tube, an outlet for withdrawing a clarified liquid from said reactor, and a standpipe which discharges separated solids inside said reactor at a point near the gas inlet;
    (e) recycling a suspension of separated solid catalyst particles directly from said hydrocyclone standpipe to the lower portion of said reactor; and
    (f) recovering a clarified partially desulfurized liquid residual oil from said reactor via the outlet from said hydrocyclone.

2. The method of claim 1 wherein the ratio between the rate of flow of clarified liquid and the rate of flow of the suspension of separated solids of each hydrocyclone is at least 1.0.

3. The method of claim 1 wherein the liquid is introduced into the reactor near the inlet of the tube.

4. The method of claim 1 wherein the gas leaving the reactor is recycled to the gas entering the bottom of the axial tube.

5. The method of claim 1 wherein at least part of said gas is a reactant.

6. The method of claim 5 wherein the liquid is saturated with gas to the extent of at least 50% under prevailing conditions of pressure and temperature, and the size of the gas bubbles in the axial tube is from 0.5–5 mm.

7. The method of claim 6 wherein the volumetric ratio of gas to liquid in the tube is from 0.2:1 to 2:1.

8. The method of claim 7 wherein the solid catalyst particles are sulfur-resistant and liquid product is recycled to liquid feed in a ratio from 4:1 to 20:1.

9. The method of claim 1 wherein the liquid recycle ratio is from 5:1 to 10:1, and the volumetric ratio of gas to liquid in the tube is from 0.5:1 to 1.0:1.

References Cited

UNITED STATES PATENTS

| | | | |
|---|---|---|---|
| 2,968,614 | 1/1961 | Brooks et al. | 208—213 |
| 2,687,992 | 8/1954 | Leffer | 208—127 |
| 2,849,384 | 8/1958 | Voorhies et al. | 208—127 |
| 2,935,374 | 5/1960 | Brooks | 208—153 |
| 3,698,876 | 10/1972 | Gregoli et al. | 208—157 |
| 2,590,219 | 3/1952 | Stephanoff | 208—158 |
| 3,674,682 | 7/1972 | Mitchell et al. | 208—157 |

DELBERT E. GANTZ, Primary Examiner

C. E. SPRESSER, JR., Assistant Examiner

U.S. Cl. X.R.

208—153, 157, 158, 161, 216